Oct. 22. 1940. A. E. NIELSEN Re. 21,606

THREADLESS INTERLOCKING ROTARY DRILL PIPE COUPLING

Original Filed May 18, 1937

Adolph E. Nielsen
INVENTOR

BY Victor J. Evans & Co.
ATTORNEYS

Reissued Oct. 22, 1940

Re. 21,606

UNITED STATES PATENT OFFICE 21,606

THREADLESS INTERLOCKING ROTARY DRILL PIPE COUPLING

Adolph E. Nielsen, Alameda, Calif., assignor, by direct and mesne assignments, of one-sixth to John W. Ricketts, one-sixth to David A. Davini, and one-third to Randal F. Dickey, all of Alameda, Calif.

Original No. 2,121,710, dated June 21, 1938, Serial No. 143,370, May 18, 1937. Application for reissue May 26, 1939, Serial No. 275,991

5 Claims. (Cl. 285—194)

This invention relates generally to threadless pipe couplings and is more particularly directed to an improved coupling of this character especially adaptable for joining adjacent lengths or stands of rotary drill pipe such as is employed in the drilling of deep wells, said coupling embodying in its structure certain features similar in character to those inherent to the sucker rod coupling disclosed in my copending application entitled "Threadless interlocking coupling," filed March 27, 1937, bearing Serial No. 133,458.

It is the principal object of the present invention to provide a threadless drill pipe coupling particularly adaptable for joining drill pipe lengths or stands in a manner to transmit great torsion, tension and compression strains; which may be easily and quickly assembled and disassembled; which when assembled will provide a rigid clutch connection preventing relative rotation and endwise movement of the connected members; which will take up for wear of the component parts; and which will compensate for radial contraction incident to elongation or stretch of the connecting members.

The invention is exemplified in the following description and illustrated by way of example in the accompanying drawing, in which.

Figure 1:
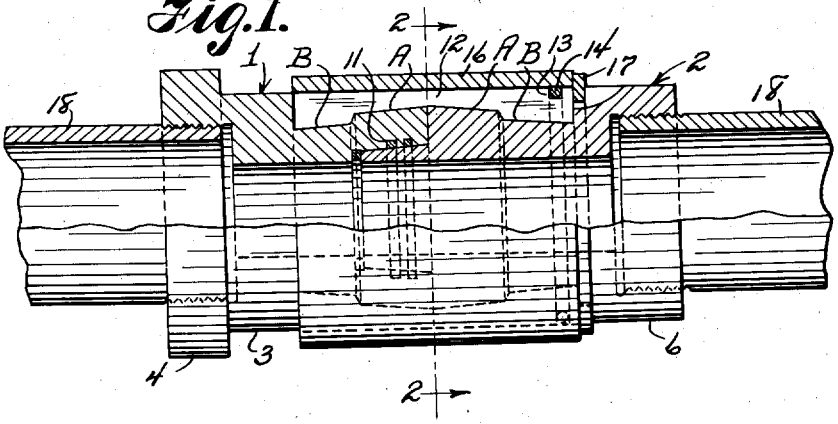
Fig. 1 is a side elevation, partly in section, illustrating a rotary drill pipe coupling constructed in accordance with the present invention.
Figure 2:
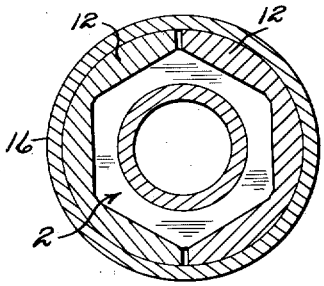
Fig. 2 is a transverse sectional view taken on the line 2—2 of Fig. 1.
Figure 3:
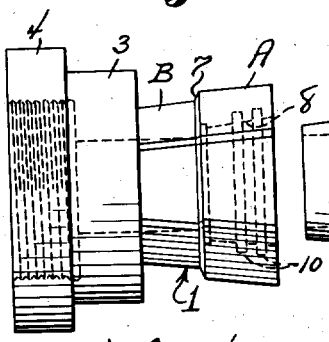
Fig. 3 is a side elevation of the female element of the coupling.
Figure 4:
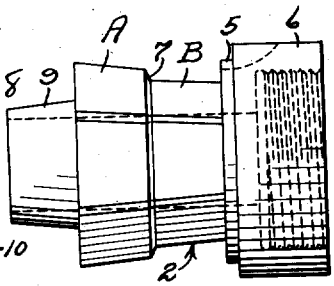
Fig. 4 is a side elevation of the male element of the coupling.
Figure 5:
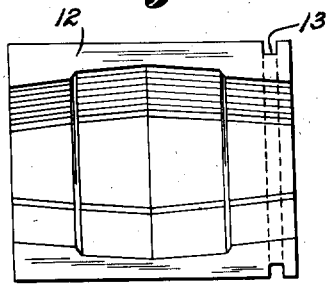
Fig. 5 is an elevation of one of the split sleeve members of the coupling, looking at the interior surface thereof.
Figure 6:
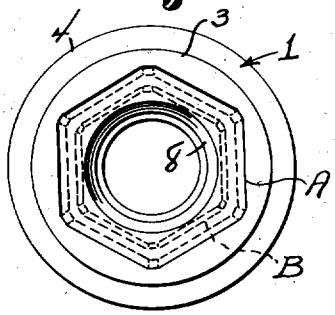
Fig. 6 is an end view of the female element of the coupling.
Figure 7:
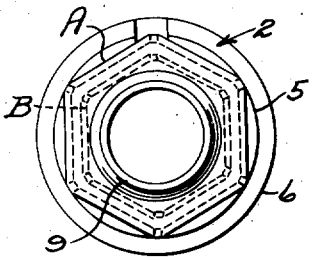
Fig. 7 is an end view of the male element of the coupling.

The specific embodiment shown in the drawing is one which is especially adaptable for use in a rotary drill pipe string such as is employed in the drilling of deep oil wells, and which will have a particular utility as a substitute for the standard screw-threaded pin and box tool joints commonly employed for connecting the several stands of a drill string.

It is well known that such screw-threaded connections do in many instances become unscrewed during drilling operations, to cause expensive fishing jobs, this unscrewing tendency being particularly prevalent in very long drill pipe strings which frequently are subjected to a whipping action which at times is very severe, not only in a straight well, which is an exception rather than the rule, but to a more pronounced degree in wells of only average straightness which deviate more or less from the vertical. Another circumstance tending to cause unscrewing of the standard tool joints of the ordinary drill pipe string is occasioned by a sticking of the drill which will cause the long drill pipe to wind up for several turns, and its sudden release which will cause the drill and the lower portion of the drill pipe string to rapidly unwind and race ahead of the balance of the string to produce a severe unscrewing tendency.

Rotary drill pipe employed in well drilling is subjected to exceedingly heavy torsional strains, an average size drill pipe of five inch diameter being constructed to withstand a torsional strain of approximately fifty tons. Therefore, it is essential that the connections of a drill pipe string be of a character which will transmit rotary driving strains of this magnitude without relative movement between the parts comprising such connections. Further, since drilling operations cause very severe longitudinal as well as rotary vibration of the entire drilling string, it is of importance that the several connections be of rigid character so as to eliminate vibratory chatter which would cause crystalization and failure of the connecting or coupling members.

It is well known that one of the most undesirable features of the standard type of screw-threaded tool joints is the length of time required to withdraw and disconnect a standard drill string, for such purposes as changing drills or replacing worn cutters, and to make up and run the string into the well again, such round trip, in deep wells of average depth, requiring upwards of three hours, depending upon the length of the string.

For these and for other reasons it has long been considered desirable by those skilled in the art of well drilling to provide a rigid fluid-tight rotary drill pipe joint or coupling capable of supporting the weight of the drill string without danger of pulling apart, which cannot become disconnected by rotary influences incident to a drilling operation, and which may be easily and quickly connected or disconnected.

The present invention provides a rotary drill pipe joint or coupling of the desired character which, in addition to being capable of transmitting heavy rotary drilling strains, is also capable of taking up for wear of the connecting elements and of compensating for longitudinal stretch thereof.

In the embodiment disclosed in the drawing, 1 designates the female element while 2 designates the male element of the joint or coupling, these elements being tubular in character and providing, when brought together, a substantially unobstructed axial flow passage.

The respective end portions 4 and 6 of the opposed coupling elements 1 and 2 are internally screw-threaded to receive adjacent drill pipe lengths 18. However, the drill pipe may be secured to said portions by welding or by other means.

Each of these opposed elements or coupling members is formed to provide a head A tapered axially and inwardly from its outer end and a shank B which is of reduced diameter to provide an intermediate angled abutment shoulder 7 and is also tapered axially and inwardly from said shoulder.

The respective heads A and shanks B are preferably substantially hexagon in cross section to provide groups of angularly related faces and the opposed transverse end surfaces of the adjacent heads are formed to fit each other when the two coupling elements 1 and 2 are brought together as shown in Fig. 1.

The female element 1 is counterbored to provide a tapered seat 8 while the male element 2 is provided with an opposed conical projection 9 axially disposed and adapted to engage the tapered seat 8 with a ground fit to form a fluid-tight joint.

To provide additional assurance against fluid leakage, packing grooves 10 are formed in the seat portion 8 of the female element and in these grooves are positioned packing rings 11 which engage the conical projection 9, when the coupling is assembled.

Surrounding the abutting coupling elements 1 and 2 are two half sections of a longitudinally split coupling sleeve 12 providing a longitudinal bore having internal walls contoured to closely fit the angularly related faces A and B and the abutment shoulders 7 of the two adjacent coupling elements, said half sections, when engaged with the headed coupling members, being slightly separated from each other so as to at all times bear directly upon the angularly related faces of both coupling members.

This split coupling sleeve 12 is disposed between an annular portion 3 of the female element 1 and an opposed annular portion 5 of the male element 2, and for the purpose of retaining the two sections of this sleeve 12 on one of the headed coupling members prior to their engagement over the companion headed coupling member, said split sleeve, near one end, is provided with an external groove 13 in which is disposed a retaining ring 14.

The external surface of the split coupling sleeve 12 is slightly tapered longitudinally from its smaller end adjacent the groove 13 to its larger end which is adjacent the annular portion 3 of the female element and is slightly larger in diameter than is said annular portion 3, and for the purpose of clamping its two half sections tightly upon the abutting headed coupling members, there is provided an outer retaining or clamping sleeve 16 having a bore longitudinally tapered to a degree corresponding to the tapered outer surface of the split coupling sleeve 12 and of such diameter that when this outer sleeve 16 is driven longitudinally over the split sleeve 12, it will rigidly clamp the two half sections of said split sleeve upon the opposed coupling elements 1 and 2.

The diameter of the portion 5 of the male element is less than the diameter of the end portion 6 to form a key seat to receive a key 17 which serves to prevent an endwise releasing movement of the retaining sleeve 16. When the key is removed, this retaining sleeve may be driven off and slid over the portions 5 and 6 to release and expose the split sleeve.

In the use of rotary drill pipe in which the standard pin and box tool joints are employed to connect the adjacent stands, it is the usual practice to place the tool joints so that the female or box members thereof face upwardly so that the companion male or pin members may be more easily and quickly "stabbed" or inserted therein.

Following this common practice, the joint or coupling herein disclosed will be similarly positioned in the drill pipe string with its female end facing upwardly so that when adding a drill pipe stand to drill pipe string already made up and lowered into a well, the male coupling member 2 on the lower end of stand to be added is "stabbed" into the female coupling member 1 at the upper end of the made up drill string, the outer retaining sleeve 16 having first been slid upwardly over the male coupling member to a position where it will be out of the way until needed. In such position it may, if desired, be slightly shifted to rest upon the upper end of the portion 6 of the male member.

With the opposed coupling elements 1 and 2 engaged in abutting relationship, the two half sections of the split sleeve 12 will be laterally applied to embrace the headed coupling members with their internal angular walls closely intermeshing or mating with the angularly related faces A and B and abutment shoulders 7 of said members, after which the ring 14 will be disposed in the groove 13 to retain the split sleeve in position until engaged by the outer retaining sleeve.

The outer retaining and clamping sleeve 16 will next be lowered to pass over the portion 6 and engage over the exterior tapered surface of the split sleeve 12 and will then be driven downwardly by suitable means to a tight wedging fit thereon so as to rigidly clamp the two half sections of the inner split sleeve 12 upon the headed coupling members of the two coupling elements 1 and 2. Since the major diameter of the split sleeve is slightly larger than that of the portion 3 of the female element 1, this outer sleeve 16 is free to be driven downwardly until the desired clamping effect is had, which will usually be until it can be driven no further by the driving force applied thereto.

With the outer sleeve thus positioned, the key 17 will be applied as shown in Fig. 1, to prevent an upward releasing movement of said outer sleeve.

If the interlocking coupling parts become worn through use, such wear may be taken up by driving the outer tapered sleeve further along on the outer tapered surface of the inner split sleeve, and in the event of longitudinal stretch of the headed coupling members, such as would cause diametric contraction thereof and a resulting loosening of the wedging engagement of the outer sleeve 16 with the inner split sleeve 12, the weight of said outer sleeve, aided by the vibration of the drill pipe string, will cause an immediate additional downward movement of the outer sleeve to compensate for such diametric contraction and maintain its clamping function.

Figure 8:
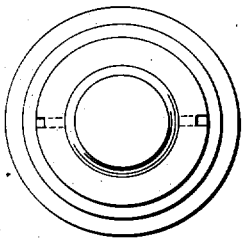
Fig. 8 is an end view illustrating a modified form of my invention.

While the angularly related faces A and B on the opposed headed coupling members and the similarly angled faces of the inner walls of the split sleeve 12 provide a strong and effective clutch means preventing relative rotation of these associated parts, these headed coupling members and the bore of the split sleeve may be round in cross section and the clutch means may be in the form of matched keys and keyways as suggested in Fig. 8 of the drawing.

Although the present invention is herein disclosed in a preferred form of embodiment, it is to be understood that various changes may be made therein by those skilled in the art without departing from the spirit of the invention as defined in the appended claims.

Having thus described my invention, what I claim and desire to secure by Letters Patent is:

1. A coupling comprising male and female elements each having a bore therethrough and the female element provided with a tapered seat, a tapered portion formed on said male element to tightly fit the tapered bore of said female element and thereby prevent leakage between said male and female elements, said female element having packing grooves, packing in said grooves and engaging the tapered extension of the male element, groups of angularly related faces formed on the male and female elements and one group of each element being of a different diameter than the diameter of the other group, a split sleeve having internal faces shaped to match the angularly related faces of the male and female elements, a retaining sleeve fitting over the split sleeve and held against endwise movement by the female element, and a key carried by the male element engageable with the retaining sleeve to secure the latter against endwise movement in an opposite direction, and means for connecting well drill tubing to said male and female elements.

2. A coupling comprising male and female elements each having a bore therethrough and the female element provided with a tapered seat, a tapered portion formed on said male element to tightly fit the tapered bore of said female element and thereby prevent leakage between said male and female elements, said female element having packing grooves, packing in said grooves and engaging the tapered extension of the male element, groups of angularly related faces formed on the male and female elements and one group of each element being of a different diameter than the diameter of the other group, a split sleeve having internal faces shaped to match the angularly related faces of the male and female elements, and a retaining sleeve embracing the split sleeve and retained against endwise movement thereon.

3. A rotary drill pipe coupling comprising cooperating tubular male and female elements adapted to be axially aligned to provide a continuous fluid passage and formed to provide opposed headed coupling members having angularly related faces, a longitudinally split coupling sleeve adapted to embrace said coupling members and having angularly related internal wall surfaces to match the angularly related faces of said coupling members, means operable to rigidly clamp said split sleeve on said coupling members, the inner end of said female element being formed to provide a tapered seat, and a tapered portion formed on said male element and adapted to engage said tapered seat and prevent leakage between said male and female elements.

4. A rotary drill pipe coupling comprising cooperating tubular male and female elements adapted to be axially aligned to provide a continuous fluid passage and formed to provide opposed headed coupling members having angularly related faces, a longitudinally split coupling sleeve adapted to embrace said coupling members and having angularly related internal wall surfaces to match the angularly related faces of said coupling members and a gradually longitudinally tapered exterior surface, an outer clamping sleeve surrounding said split sleeve and having a similarly tapered internal wall surface engaging the tapered external surface of said split sleeve and adapted for axial translation to rigidly clamp said split sleeve on said coupling members, the inner end of said female element being formed to provide a tapered seat, and a tapered portion formed on said male element and adapted to engage said tapered seat and prevent leakage between said male and female elements.

5. A rotary drill pipe coupling comprising cooperating tubular male and female elements adapted to be axially aligned to provide a continuous fluid passage and formed to provide opposed headed coupling members having angularly related clutch faces, a coupling sleeve longitudinally split to provide opposed sleeve sections each adapted to interlockingly embrace said coupling members and each having angularly related internal wall surfaces to match the clutch faces thereof, contractile means engaging said sleeve sections and tending to yieldingly maintain them in assembled relationship, means operable to rigidly clamp said sleeve sections on said coupling members, the inner end of said female element being formed to provide a tapered seat, and a tapered portion formed on said male element and adapted to engage said tapered seat and prevent leakage between said male and female elements.

ADOLPH E. NIELSEN.